United States Patent [19]

Emerson

[11] 3,776,606
[45] Dec. 4, 1973

[54] FREQUENCY TO VOLTAGE CONVERTER EMPLOYING HALL EFFECT CELL WITH SIGNAL HYSTERESIS AND NORMALIZING

[75] Inventor: L. Frank Emerson, Williamsport, Pa.

[73] Assignee: GTE Sylvania Incorporated, Seneca Falls, N.Y.

[22] Filed: June 13, 1972

[21] Appl. No.: 262,344

[52] U.S. Cl. ............ 303/21 CF, 307/261, 307/278, 307/309, 317/5, 324/45, 329/200
[51] Int. Cl. ............................................. B60t 8/08
[58] Field of Search .................... 188/181 R, 181 A; 303/20, 21; 307/261, 278, 309; 317/5; 324/45, 160–162; 329/200; 330/6; 340/262–263; 318/647, 653

[56] References Cited
UNITED STATES PATENTS

| | | |
|---|---|---|
| 3,597,011 | 8/1971 | Clifford ........................... 303/21 BE |
| 3,317,829 | 5/1967 | Kuhrt et al. ....................... 324/45 X |
| 3,606,490 | 9/1971 | Ando .............................. 303/21 BE |
| 3,642,329 | 2/1972 | Zechnall et al. ................. 303/21 BE |
| 3,596,114 | 7/1971 | Maupin et al. .................. 307/309 X |
| 3,195,043 | 7/1965 | Burig et al. ..................... 307/309 X |

*Primary Examiner*—George E. A. Halvosa
*Assistant Examiner*—Stephen G. Kunin
*Attorney*—Norman J. O'Malley et al.

[57] ABSTRACT

Frequency to voltage converter apparatus suitable for use in wheeled vehicle anti-skid devices includes a source of magnetic flux varying between upper and lower levels at a rate representative of vehicle wheel speed with a Hall effect cell device responsive to the rate of upper and lower flux variation to provide varying electrical signals which are applied by electrical circuitry to a braking system for effecting control of the wheel speed.

6 Claims, 3 Drawing Figures

FREQUENCY TO VOLTAGE CONVERTER EMPLOYING HALL EFFECT CELL WITH SIGNAL HYSTERESIS AND NORMALIZING

BACKGROUND OF THE INVENTION

Generally, present-day braking systems include an anti-skid capability which, in turn, usually has some means for converting the rate of change of rotational speed of a wheel into an electrical signal. This electrical signal is then employed to control the application of braking power to the wheel of the vehicle.

Frequently, the frequency to voltage conversion is achieved by some form of mechanical or pseudo-mechanical apparatus. One known technique includes a spring-loaded mass associated with the wheel of a vehicle and coupled to electrical circuitry whereby the rotational speed of the wheel is converted by the spring-loaded mass and electrical circuitry into electrical signals for activating a braking system.

Another known frequency to voltage conversion system includes a notched disc affixed to the rotating wheel and a fixed pickup coil associated with the disc. The rotational speed of the notched disc in combination with the fixed pickup provides a magnetic flux and then an electrical signal indicative of the wheel speed. In turn, the electrical signal is utilized to control the braking of the wheel whereby anti-skid braking is effected.

Although the above-mentioned techniques have been and still are extensively employed with a great deal of success in numerous forms of apparatus, it has been found that there are occasions and apparatus wherein such techniques leave something to be desired. For example, small, low cost, precision speed devices having very definitive switching capabilities are often desired. Also, the development of an analog potential substantially independent of mechanical interface which can reliably track acceleration and deceleration changes is often required.

OBJECTS AND SUMMARY OF THE INVENTION

An object of the present invention is to provide improved frequency to voltage conversion apparatus. Another object of the invention is to provide enhanced frequency to voltage conversion signals suitable for utilization in an anti-skid braking system for wheeled vehicle. Still another object of the invention is to provide improved frequency to voltage conversion apparatus employing electronic means for effecting magnetic flux to electrical signal conversion. A further object of the invention is to provide improved frequency to voltage conversion apparatus which includes electronic circuitry having signal hysteresis capabilities.

These and other and further objects, advantages and capabilities are achieved in one aspect of the invention by frequency to voltage conversion apparatus wherein magnetic flux is varied between upper and lower levels in accordance with the speed of a wheel and a Hall effect cell means coupled to the varying magnetic flux means provides electrical signals representative of the wheel speed while electrical circuit means coupled to the Hall effect cell means applies the electrical signals to and controls the operation of an anti-skid braking system.

PREFERRED EMBODIMENT OF THE INVENTION

For a better understanding of the present invention, together with other and further objects, advantages and capabilities thereof, reference is made to the following disclosure and appended claims in connection with the accompanying drawings.

Figure 1:
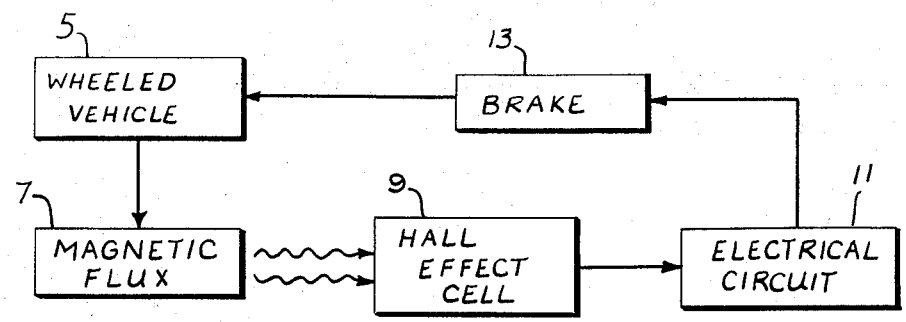
FIG. 1 is a diagrammatic illustration, in block form, of an anti-skid braking system employing a preferred embodiment of the present invention.

Referring to the drawings, FIG. 1 illustrates, in diagrammatic form, an anti-skid braking system wherein a wheeled vehicle 5 is coupled to a magnetic flux apparatus 7 to provide magnetic flux varying in accordance with the speed of the wheel. This varying magnetic flux is applied to a Hall effect cell 9 whereby electrical signals representative of the rotational speed of the wheel are developed. These electrical signals are applied to electrical circuitry 11 wherein desired amplification and modification is achieved and the signal is then applied to a braking system 13. In turn, the braking system 13 is employed to control the rotational speed of the wheeled vehicle 5.

Figure 2:
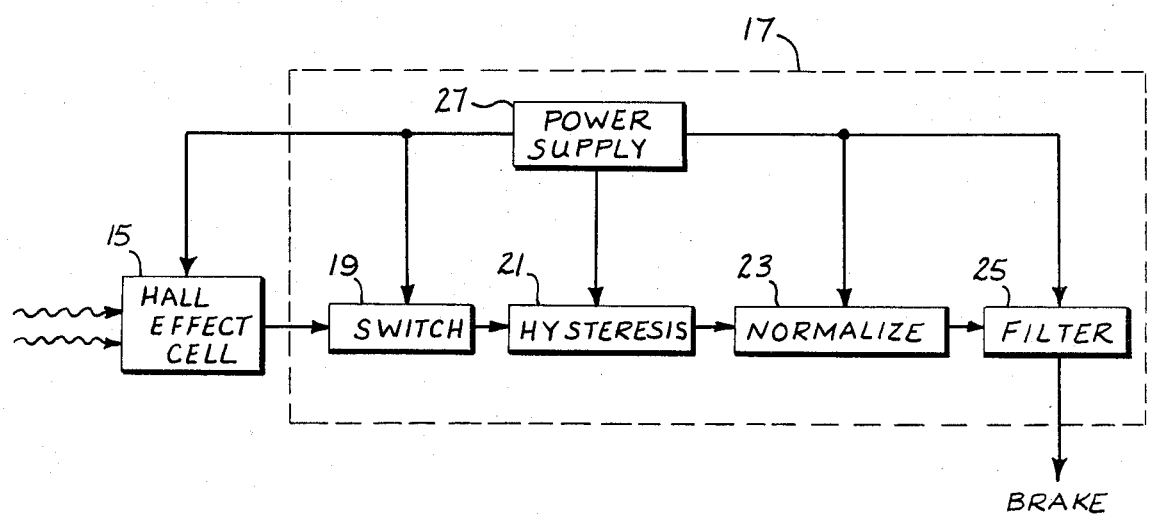
FIG. 2 is a diagrammatic illustration, in block form, of a preferred form of frequency to voltage converter apparatus.

More particularly, FIG. 2 diagrammatically illustrates a preferred form of frequency to voltage converter apparatus. Herein, magnetic flux representative of the rotational speed of a wheel is applied to a Hall effect cell means 15. This Hall effect cell means 15 is coupled to electrical circuitry 17 which is, in turn, coupled to braking apparatus.

The electrical circuitry 17 includes switching circuit means 19 which couples the Hall effect cell means 15 to a hysteresis signal means 21. The hysteresis signal means 21 responds to varying "turn-on" and "turn-off" signal levels and applies a resulting signal to a normalizing circuit means 23 wherein a signal having a substantially constant pulse width is developed and applied to a filtering means 25. The filtering means 25 provides an output signal substantially devoid of relatively small and insignificant changes and applies this output signal to a braking system. Moreover, a power source 27 is coupled to the Hall effect cell means 15 as well as to the switching circuit means 19, hysteresis signal means 21, normalizing circuit means 23, and the filtering means 25.

Figure 3:
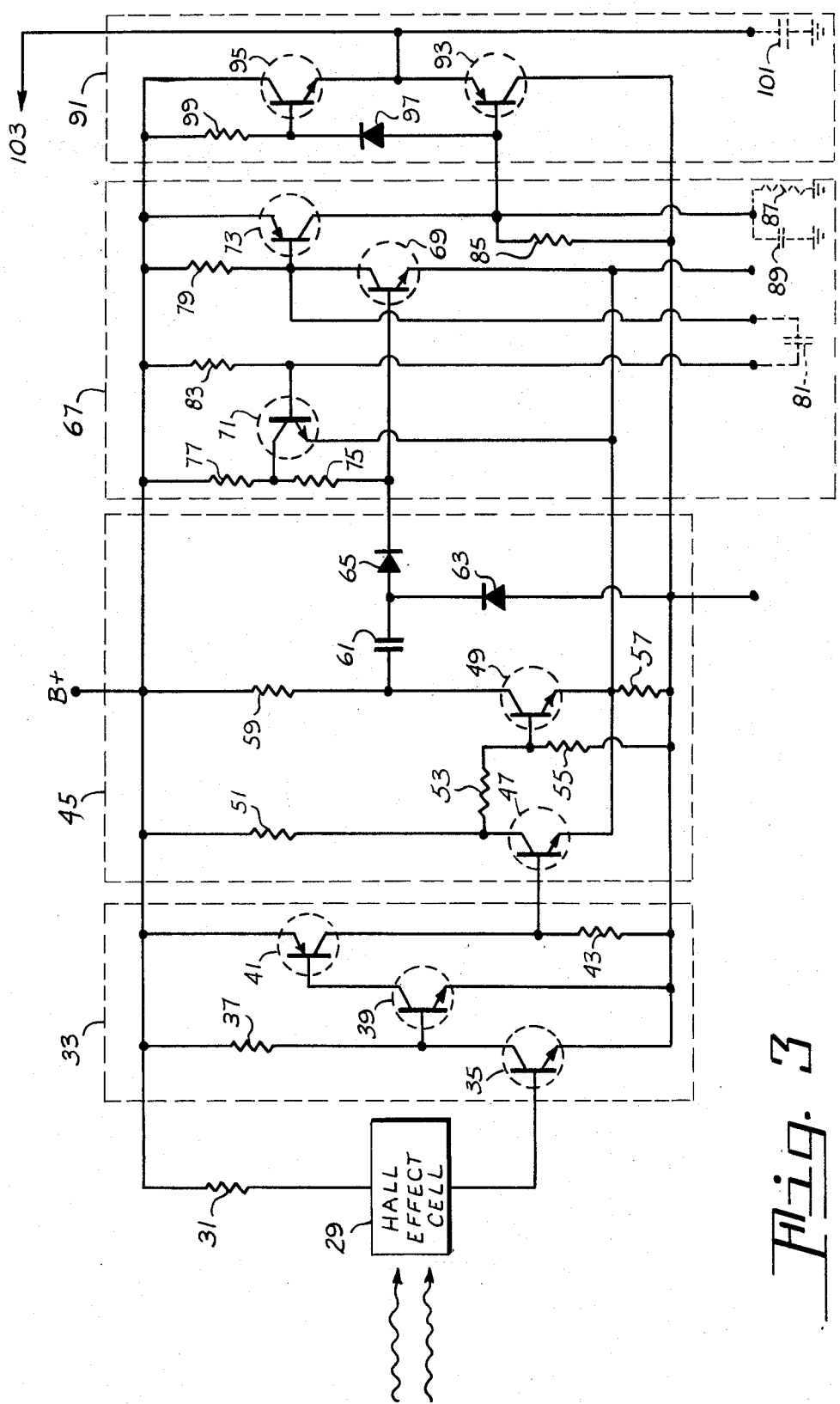
FIG. 3 is a diagrammatic illustration, in schematic form, of the frequency to voltage converter apparatus of FIG. 2.

Specifically, FIG. 3 illustrates a preferred form of frequency to voltage converter suitable for use with an anti-skid braking system of a wheeled vehicle. Herein a Hall effect cell means 29 is coupled to a magnetic flux source wherein the magnetic flux varies between upper and lower levels at a rate proportional to the rotational speed of a wheel. Also, the Hall effect cell means 29 is coupled by a resistor 31 to a power source B+.

A switching circuit means 33 includes a first transistor 35 coupled to the Hall effect cell means 29 and via a resistor 37 to the power source B+ and to a potential reference level. Also, the switching circuit means 33 includes second and third transistors 39 and 41 with the first transistor 39 having a base electrode coupled to the junction of the first transistor 35 and a resistor 37, an emitter electrode coupled to the potential reference level and a collector electrode coupled to the base electrode of the third transistor 41. The third electrode 41 has an emitter coupled to the power source B+ and via a resistor 43 to the potential reference level.

Coupled to the switching circuit means 33 is a hysteresis signal means 45 having first and second transistors 47 and 49. The first transistor 47 has a base electrode coupled to a junction of the third transistor 41 and a resistor 43 of the switching circuit means 33. A voltage divider includes resistors 51, 53, and 55 series connected intermediate the power source B+ and the potential reference level. The first transistor 47 has a collector electrode coupled to the junction of the series connected resistors 51 and 53 and an emitter coupled to the emitter of the second transistor 49 and via a resistor 57 to the potential reference level.

The second transistor 49 has a base electrode coupled to the junction of the series connected resistors 53 and 55 and a collector electrode coupled via a resistor 59 to the power source B+. The collector of the second transistor 49 is also coupled via a series connected capacitor 61 and first diode 63 to the potential reference level with a second diode 65 coupling the junction of the series connected capacitor 61 and first diode 63 to a normalizing circuit means 67.

The normalizing circuit means 67 includes first, second, and third transistors, 69, 71, and 73, with the first transistor 69 having a base electrode connected to the second diode 65 of the hysteresis signal means 45 and via series connected first and second resistors 75 and 77 to the power source B+. The emitter electrode of the first transistor 69 is connected to the potential reference level via a resistor 57 and to an external lead while the collector electrode is coupled to the base electrode of the third transistor 73 and by way of a resistor 79 to the power source B+.

The second transistor 71 has a base electrode coupled to an affixed capacitor 81 and via a resistor 83 to the power source B+. The collector electrode is coupled to the junction of the series connected resistors 75 and 77 while the emitter electrode is coupled to the potential reference level via the resistor 57. The third transistor 73 has a base electrode coupled to the junction of the second transistor 69 and resistor 79, an emitter electrode coupled to the potential source B+ and a collector electrode coupled by a resistor 85 to the potential reference level and via an externally connected parallel combination of resistor 87 and capacitor 89 to circuit ground.

Coupled to the normalizing circuit means 67 is a filtering means 91 having first and second transistors, 93 and 95 respectively. The first transistor 93 has a base electrode coupled to the normalizing circuit means 67 and via a series connected diode 97 and resistor 99 to the power source B+. An emitter electrode is coupled to the emitter electrode of the second transistor 95, an external capacitor 101 connected to circuit ground, and an output terminal 103 coupled to a braking system. The collector electrode of the first transistor 93 is connected to circuit ground. The second transistor 95 has a base electrode coupled to the junction of the diode 97 and resistor 99, a collector electrode coupled to the power source B+ and an emitter electrode coupled to the output terminal 103.

As to operation, a magnetic flux source, such as a wheel with multiple gear teeth in conjunction with a magnetic device for example, switches a magnetic flux from a low level to a high level when a gear tooth is in close proximity to the magnetic device and back to a low level as the gear tooth is displaced from the magnetic device. Thus, the rate at which the flux switches between high and low levels represents the rotational speed of the wheel.

A Hall effect cell means 29 is coupled to the potential source B+ and to the base electrode of the first transistor 35 of the switching circuit means 33 whereupon current flows and conduction of the first transistor 35 occurs when the Hall effect cell 29 is not activated. As a gear tooth approaches a magnetic device, the magnetic flux shifts to a high level and a reverse current is developed by the Hall effect cell (HEC) 29 which cancels the current therethrough and switches the first transistor 35 to a non-conductive state.

When the first transistor 35 switches to a non-conductive state, the collector potential increases and the second transistor 39 is shifted from a non-conductive to a conductive state. In turn, shifting the second transistor 39 to a conductive state causes a shift in the third transistor 41 from a non-conductive to a conductive state whereupon current is supplied to the load resistor 43 and a substantially sinusoidal signal potential $e_s$ is developed at the resistor 43.

This substantially sinusoidal signal potential $e_s$ available at the resistor 43 is applied to the base electrode of the first transistor 47 of the hysteresis signal means 45. As the signal potential $e_s$ reaches a given threshold level the first transistor 47 shifts from a non-conductive to a conductive state. Thereupon the bias potential appearing at the base electrode of the second transistor 49 decreases and the second transistor 49 shifts from a conductive to a non-conductive state whereupon the potential appearing at the emitter electrodes of both first and second transistors 47 and 49 is lowered. As a result, a second threshold level is established for the first transistor 47 whereupon a shift from conductive to non-conductive states of the first transistor 47 occurs at a second threshold level. Thus, the circuitry is activated at different signal levels and a hysteresis condition is provided.

Further, a shift from conductive to non-conductive state of the second transistor 49 causes development of a potential which is applied via the capacitor 61 and second diode 65 to the first transistor 69 of the normalizing circuit means 67. Moreover, when the second transistor 49 is in a conductive state, the first diode 63 serves as a low resistance load for the capacitor 61 whereupon the potential appearing at the output electrode of the second transistor 49 is decoupled from the normalizing circuit means 67.

Assuming the second transistor 49 is in a non-conductive state, a potential is applied via the capacitor 61 and diode 65 to the first transistor 69 of the normalizing means 67. This first transistor 69 responds to the applied potential by shifting from a non-conductive to a conductive state whereupon the charge on the external capacitor 81 is dissipated and the base of the second transistor 71 is, for all practical purposes, clamped to circuit ground via the external capacitor 81 and first transistor 69. Thus, the second transistor 71 is rendered non-conductive and the potential across the voltage divider comprising resistors 77 and 75 serves to maintain the first transistor 69 in a conductive state.

As current flows through the resistor 83 and the capacitor 81, a potential is developed across the capacitor 81. As this potential, developed across the capacitor 81, reaches a value which exceeds the threshold potential appearing at the emitter electrode of the second transistor 71, established by the voltage drop across the resistor 57, the second transistor 71 is turned on or becomes conductive. Thereupon, the potential applied to the base electrode of the first transistor 69 is reduced and the first transistor 69 shifts to a non-conductive state. Thue, the first transistor 69 provides a pulse signal of substantially uniform pulse width which is initiated by the signal from the hysteresis means 45 and terminated in accordance with the time constant of the resistor 83 and capacitor network 81. In this manner, the leading edge of a signal provided by the Hall effect cell 29 initiates a signal which has a substantially constant period independent of noise and interference.

In turn, these substantially uniform and noise-free pulse signals are applied to the third transistor 73 whereby the network consisting of the resistor 87 and capacitor 89 is charged to a DC potential. This DC potential which varies in accordance with the amount of pulse signals applied thereto represents an analog voltage of the speed as detected by the Hall effect cell 29.

This DC potential available at the network of the resistor 87 and capacitor 89 is applied to the first transistor 93 and via diode 97 to the second transistor of the filtering means 91 which includes the above-mentioned high speed switching transistors. Resistor 99 provides a bias potential for the second transistor 95 such that low level signal voltages activate the second transistor 95 to provide a current path for charging the capacitor 101. The first transistor 93 has a reverse function such that conduction of the first transistor 93 occurs at the time of non-conduction of the second transistor 95 and also provides a path for charging the capacitor 101. Thus, a reduction in potential at the capacitor 89 provides forward bias for the first transistor 93 whereby a charge potential is developed at the capacitor 101. Moreover, when the charge potential at the capacitor 101 is equal to the charge potential at the capacitor 89, conduction of the first transistor 83 is discontinued.

Thus, the capacitor 101 of the filtering means 91 is normally in the range of about 10:1 with respect to the charging capacitor 89 of the normalizing circuit means 67. In this manner the larger capacitor 101 is utilized to filter undesired ripple potentials which are obviously while the small capacitor 89 in conjunction with the fast switching transistors, 93 and 95 respectively, serves to respond to relatively fast changes in accelleration and deceleration of the magnetic field and the wheel speed.

Thus, there has been provided unique frequency to voltage conversion apparatus especially applicable to wheeled vehicle braking systems. The apparatus is relatively small, inexpensive, and provides the desired electronic precision for wheel speed control. The apparatus is particularly adapted to monolithic construction utilizing an 8-pin dual-in-line package. Also, non-definitive switching is virtually eliminated by the hysteresis capabilities of the circuitry while regulated signals substantially independent of mechanical capabilities are developed and utilized for wheel speed control. Moreover, these regulated signals serve to reliably track speed changes and are substantially immune to undesired noise and ripple potentials.

While there has been shown and described what is at present considered the preferred embodiment of the invention, it will be obvious to those skilled in the art that various changes and modifications may be made therein without departing from the invention as defined by the appended claims.

WHAT IS CLAIMED IS:

1. In a braking system for a wheeled vehicle, a frequency to voltage converter comprising:
    magnetic flux means providing magnetic flux varying between upper and lower flux levels at a rate representative of the rotational speed of a wheel;
    Hall effect cell means coupled to said magnetic flux means and providing electrical signals representative of said rate of upper and lower levels of magnetic flux variation; and
    electrical circuit means coupled to said Hall effect cell means for applying said electrical signals to a braking system of a wheeled vehicle, said electrical circuit means including a series connecting switching means, hysteresis means having a first threshold level for "turn-on" and decoupling and a second threshold level for "turn-off" and coupling, and a normalizing means for providing uniform pulse potential output signals.

2. The frequency to voltage converter of claim 1 including a filtering means coupling said normalizing means to said braking system whereby relatively small magnitude variations of an electrical signal from said waveform normalizing means are filtered and not applied to said braking system.

3. A frequency to voltage converter suitable for use with a wheeled vehicle braking system comprising:
    means for developing upper and lower magnetic flux levels varying at a rate substantially proportional to the rotational speed of a wheel;
    Hall effect cell means responsive to said varying rate of magnetic flux for providing a varying rate of electrical signals; and
    switching means, hysteresis signal means, waveform normalizing means, and filtering means series coupling electrical signals from said Hall effect cell means to a braking system of a wheeled vehicle.

4. The frequency to voltage converter of claim 3 wherein said switching means includes first, second, and third series connected transistors coupled to said Hall effect cell means.

5. The frequency to voltage converter of claim 3 wherein said first transistor of said switching means is conductive at a first level of magnetic flux and said second and third transistors are non-conductive while said first transistor is non-conductive and said second and third transistors conductive at a second level of magnetic flux.

6. The frequency to voltage converter of claim 3 wherein said circuitry is adapted to monolithic configuration.

* * * * *